(12) United States Patent
Warszewski

(10) Patent No.: US 7,665,966 B2
(45) Date of Patent: Feb. 23, 2010

(54) FLOW-CONTROLLED WIND ROTOR

(75) Inventor: Jaroslaw Warszewski, Chodzież (PL)

(73) Assignee: Ventus Spolka Z.O.O, Gorzow (PL)

( * ) Notice: Subject to any disclaimer, the term of this patent is extended or adjusted under 35 U.S.C. 154(b) by 412 days.

(21) Appl. No.: 10/599,965

(22) PCT Filed: Apr. 12, 2005

(86) PCT No.: PCT/PL2005/000026

§ 371 (c)(1),
(2), (4) Date: Oct. 16, 2006

(87) PCT Pub. No.: WO2005/100785

PCT Pub. Date: Oct. 27, 2005

(65) Prior Publication Data

US 2007/0201981 A1    Aug. 30, 2007

(30) Foreign Application Priority Data

Apr. 16, 2004    (DE) .................. 10 2004 019 620

(51) Int. Cl.
*F03B 13/18*    (2006.01)
(52) U.S. Cl. ........................... 416/17; 416/111
(58) Field of Classification Search ............ 416/17, 416/110, 111
See application file for complete search history.

(56) References Cited

U.S. PATENT DOCUMENTS

| 4,380,417 A | 4/1983 | Fork |
| 4,609,827 A | 9/1986 | Nepple |
| 4,979,871 A | 12/1990 | Rainer |
| 6,379,115 B1 | 4/2002 | Hirai |
| 2003/0049128 A1 | 3/2003 | Rogan |

FOREIGN PATENT DOCUMENTS

| DE | 197 15 373 | 10/1998 |
| FR | 2 459 380 | 1/1981 |
| JP | 56 027078 | 3/1981 |

*Primary Examiner*—Edward Look
*Assistant Examiner*—Dwayne J White
(74) *Attorney, Agent, or Firm*—Oliff & Berridge, PLC

(57) ABSTRACT

A flow-controlled wind motor rotor has one or more blades which are parallel to a central vertical axis. The blades are orientable to the direction of the wind. The rotor is equipped with a wind vane for detecting of a wind direction and also with a primary control mechanism which is controlled by the wind vane, and a secondary control mechanism, which is subordinate to the first control mechanism. The primary control mechanism is driven by a V-belt, while the secondary control mechanism is driven by a stepping engine with a worm gear.

7 Claims, 3 Drawing Sheets

FLOW-CONTROLLED WIND ROTOR

CROSS-REFERENCE TO RELATED APPLICATIONS

This is a National Stage Application of International Patent Application No. PCT/PL 2005/000026, with an international filing date of Apr. 12, 2005, which is based on a German Patent Application No. 10 2004 019 620.6, filed Apr. 16, 2004. The contents of both of these specifications are incorporated herein by reference.

BACKGROUND OF THE INVENTION

1. Field of the Invention

The invention concerns a flow-controlled wind rotor adjustable by a wind vane and having a vertical axis of rotation and rotating blades revolving around the axis.

2. Background

Wind rotors with vertical rotation axes are known in the art as Savonius rotors, Darrieux rotors, vertical dual rotors, or Jackson rotors. Jackson rotors have not only a vertical axis, but comprise also blade-like plates, revolving around the vertical axis and simultaneously turning around their own axis by 180°.

Based on the design of Jackson rotors, solutions have been developed and described, e.g., in specifications of German Patents DE 198 47 469 A, DE 81 119 10 U1 and DE 39 18 184A1.

The invention disclosed in DE 30 18 211 C2 has a design similar to that of a Darrieux rotor. This rotor includes, however, blades having only a limited movement. The efficiency of Darrieux rotors is low. They require strong winds and frequently an auxiliary starter.

Wind motors most commonly-used in practice employ rotors having a horizontal axis of rotation and propeller-like blades rotating around that axis.

Rotor blades working based on this principle are much flatter at the outside than near the axis of rotation. They use as little as 16 to 27% of the theoretically-available wind energy. A support tower for wind rotors which revolve around a horizontal axis must be higher than for rotors revolving around a vertical axis of rotation. The blades working like a propeller move unevenly to the wind flow along their entire length. They are slower near the axis than at the edges of the blades. This results in considerable noise and a poor use of the working area of the blade.

In the specification DD 232 959 A1 described is a rotor for wind motors having a vertical axis, wherein an unsymmetrical design has been used allowing for automatic or forced adjustments of the angles of attack at any time during operation so that the aerodynamic forces constantly change to keep the direction of rotation invariant. With the increase of wind power and the change of the angles of attack of the rotor blades, the number of revolutions will decrease, and aerodynamic forces will drop to around zero. The blades of this wind motor are on one hand fixedly interconnected by means of gears and timing belts, on the other hand, however, are freely movable to allow them to adjust, with their special aerodynamic profile, automatically and optimally to the direction of the wind. Still, it is not discernable how the basic orientation of the rotor blades can change to follow the direction of the wind so as to enable the wind motor to start automatically.

SUMMARY

An objective of the invention is to create a flow-controlled rotor with a vertical axis of rotation, using the power of wind aerodynamically and most efficiently, having a relatively simple control mechanism, and being adjustable and controllable by means of a wind vane.

This objective has been accomplished with features of claim 1. Further embodiments and beneficial improvements are the subjects of the other claims.

The rotor is used to drive a wind motor and comprises one or more blades rotating around a central vertical axis of rotation, which are oriented parallel to the vertical axis, linked by crossbars, and freely rotatable. The blade have a full-length symmetric and aerodynamic cross-sectional profile and are adjustable to the wind direction by means of a wind vane.

The blades are controlled at each point of their trajectory of movement around the central vertical axis of rotation by a primary and a secondary control mechanisms in a way so that they are powered by a steam of air (wind) with the greatest aerodynamic efficiency.

The primary control mechanism orients the profile of the crossbar-disposed blade(s) in the direction of the wind at each point of the trajectory around the central vertical axis as controlled by the wind vane, and the secondary control mechanism orients the crossbar-disposed blade(s) to the wind with their longitudinal axes depending on the angle of rotation of the crossbars with respect to the wind vane and the speed of rotation of the crossbars at each point of the trajectory around the central vertical axis of rotation, so that the blade(s) produce an optimum aerodynamic force at each point of the trajectory.

The secondary control mechanism is thereby subordinate to the primary control mechanism, which controls the basic alignment to the direction of the wind.

To produce a continuous torque, the profile of the rotor's blades is always so oriented to the wind direction during the path of rotation around the vertical axis so as to attain the optimal uplift pressure, with the pitch angle being adjusted to the direction of the wind plus or minus a certain degree depending on the angle of rotation.

Wind motors may be placed on a tower, a building or in areas of advantageous wind flow.

The invention features may be analogically applied to a water turbine, wherein the torque is hydrodynamically produced to the direction of rotation.

BRIEF DESCRIPTION OF THE DRAWINGS

The invention is explained hereinbelow more closely in its preferred embodiments on the basis of the drawings, in which.

DETAILED DESCRIPTION

Figure 1:
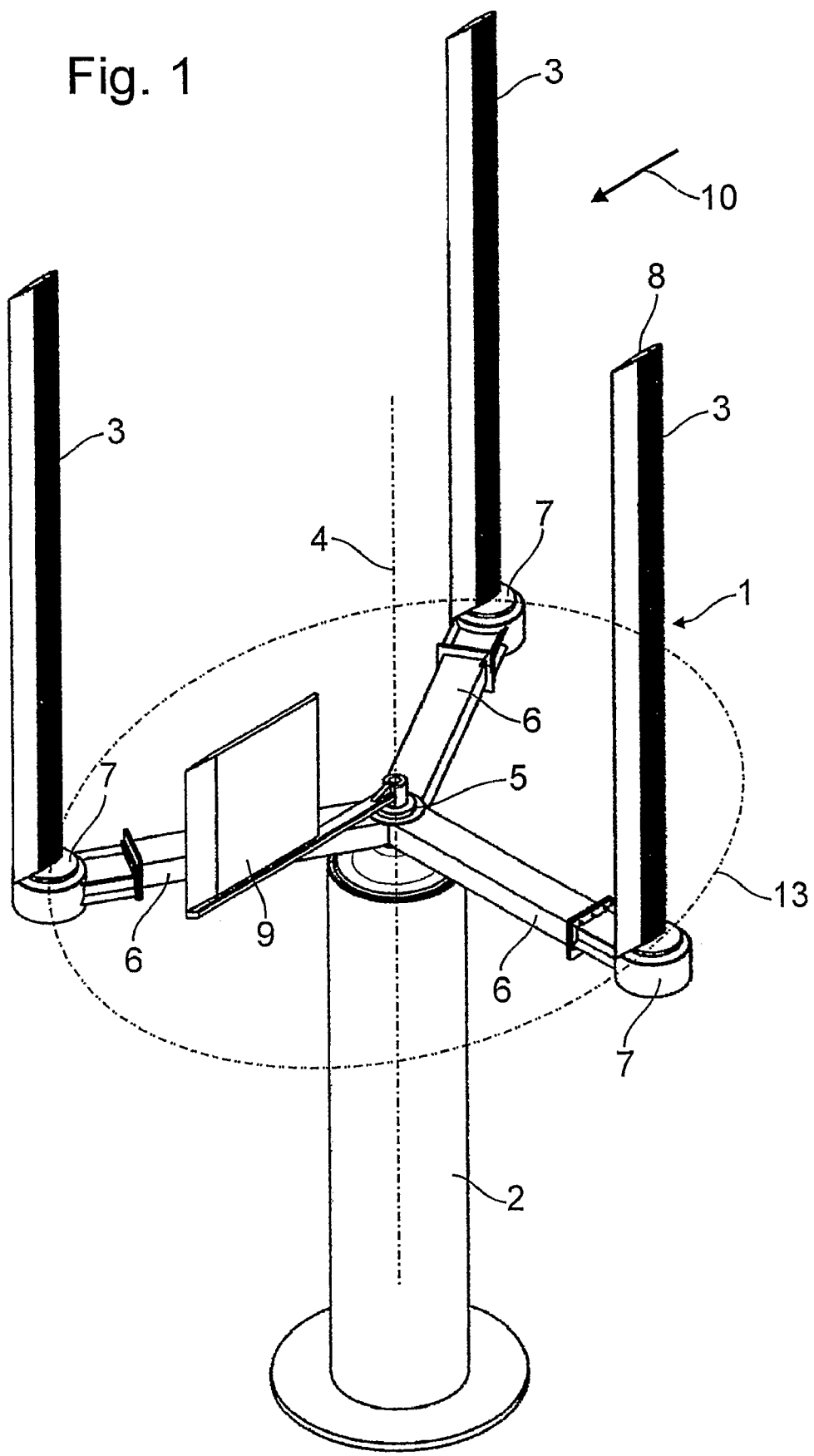
FIG. 1 is an isometric projection of a flow-controlled rotor according to certain embodiments of the invention.

The wind motor in FIG. 1 comprises of a tower 2, with a wind rotor 1 rotationally disposed on the main bearing 5. The wind rotor 1 comprises three blades 3 rotating around a central vertical axis 4, the blades being parallel to the vertical axis 4 and connected by crossbars 6. The blades 3 are disposed freely rotatably in the bearings 7 at the ends of the crossbars 6. The blades 3 revolve firstly with the crossbars 6 around the central vertical axis of rotation 4, and secondly around themselves in the bearings 7 at the ends of the crossbeams 6. The blades 3 exhibit in their cross-section at their full length a symmetric aerodynamic profile 8 similar to that of the wing area of a plane.

A wind vane 9 for detecting the direction of the wind 10 is disposed concentrically on the central axis 4 in the main bearing 5 on the tower 2.

The blades 3 controlled by the primary and secondary control mechanisms 11 and 12 revolve with their bearings 7 around the vertical axis 4 on a circular trajectory 13 so that the blade profiles 8 are always oriented parallel to the direction of the wind 10 plus or minus a certain amount for an optimal pitch angle with respect to the direction of the wind as reported by the wind wave 9.

Figure 2:
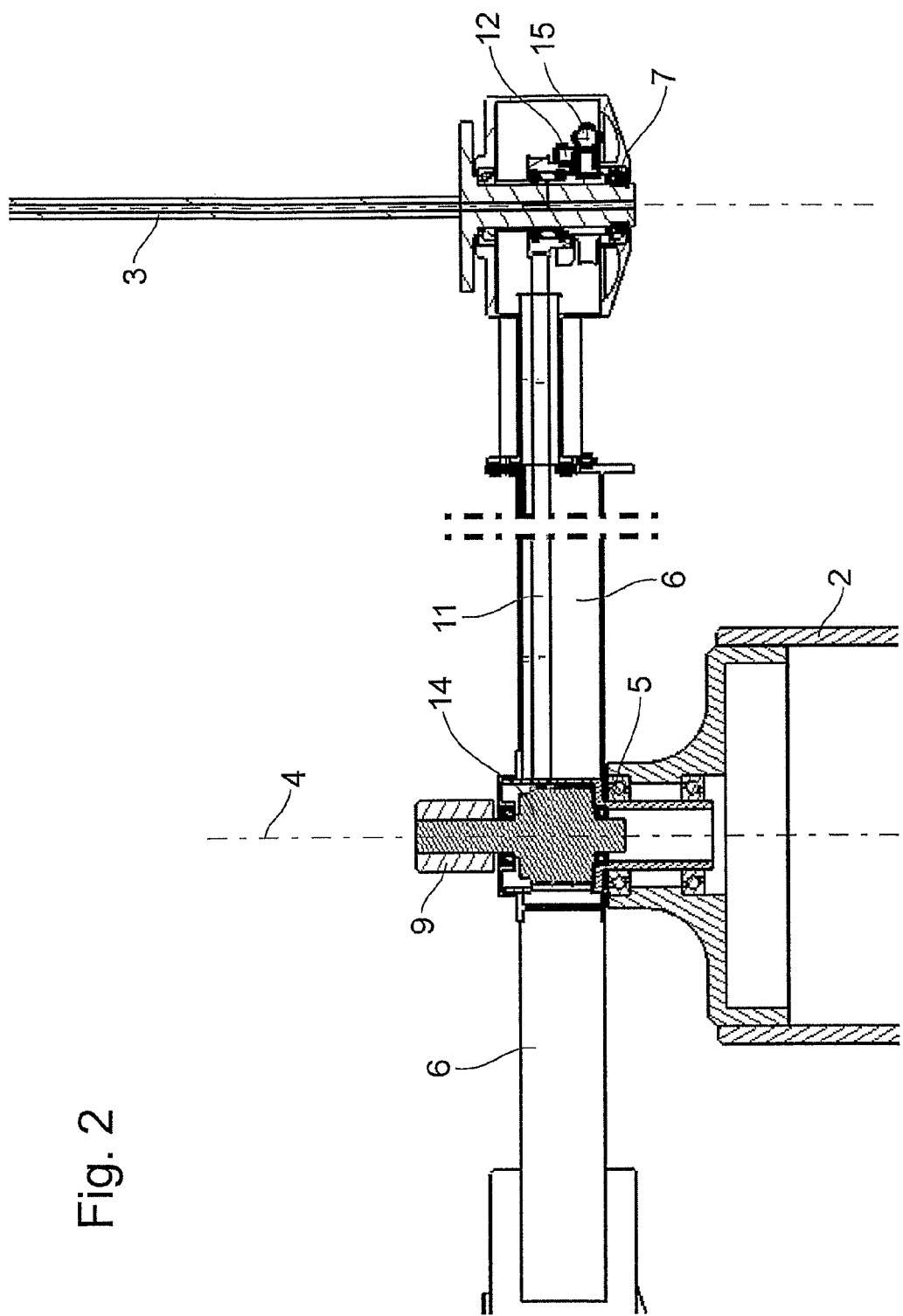
FIG. 2 is a cross-sectional diagram of one embodiment of the control mechanisms for blade alignment according to the invention.

The proper shape of the control mechanisms 11 and 12 for aligning the blades of the wind rotor 3 is shown in FIG. 2.

On the tower 2 of the wind motor disposed is the wind rotor 1 being rotatable around the central vertical axis 4 by means of the main bearing 5.

In front of the main bearing 5 of the wind motor rotor 1 is a crossbar 6, shortened in the surface of the drawing, and a second crossbar 6 marked leaning to the back.

Inside the bushing of the main bearing 5, there is a wind vane 9 with a three-leveled groove pulley 14 disposed concentrically with respect to the main bearing 5 being independent therefrom. From each level of the groove pulley 14 leads a v-belt along each of the crossbars 6 to the blade 3. This v-belt drive 14 comprises the first control mechanism 11 which aligns the blades 3 at each point of their trajectory 13 parallel to the wind vane 9. The blade bearings 7 of each of the blades 3 are for this reason fastened to the crossbars 6 each at a different height.

Inside each of the blade bearings 7, there is a stepping engine 15, which, acting as the secondary control mechanism 12, shifts via a worm gear each blade 3 to a certain positive or negative extent with respect to the direction parallel to the wind vane 9 so as to attain an optimal angle of wind attack.

The primary control mechanism 11 aligns the blades 3 with their profiles 8 by means of the wind vane 9 along the direction of the wind 10 at each point along the blades' trajectory around the central vertical axis of rotation 4.

To execute the two independent rotational movements in the blade bearings 7, the blade bearings comprise also two concentrically-disposed and independently-rotating bearing bushings.

The secondary control mechanism 12, dependent on the primary control mechanism 11, aligns each blade 3 disposed on its crossbar 6 with the wind 10 at each point of trajectory 13 around the central horizontal axis 4, so that depending on the angle of rotation of each crossbar 6 with respect to the wind vane 9, each blade 3 is aligned with the longitudinal axis of its profile 8 at each point of its trajectory 13 so as to produce an optimum aerodynamic force.

Besides, the blades 3 are aligned to the wind based on the rotation velocity of the crossbars 6, which changes with the wind velocity 10, in a way that keeps the rotation velocity approximately constant and prevents the overload of the engine.

Figure 3:
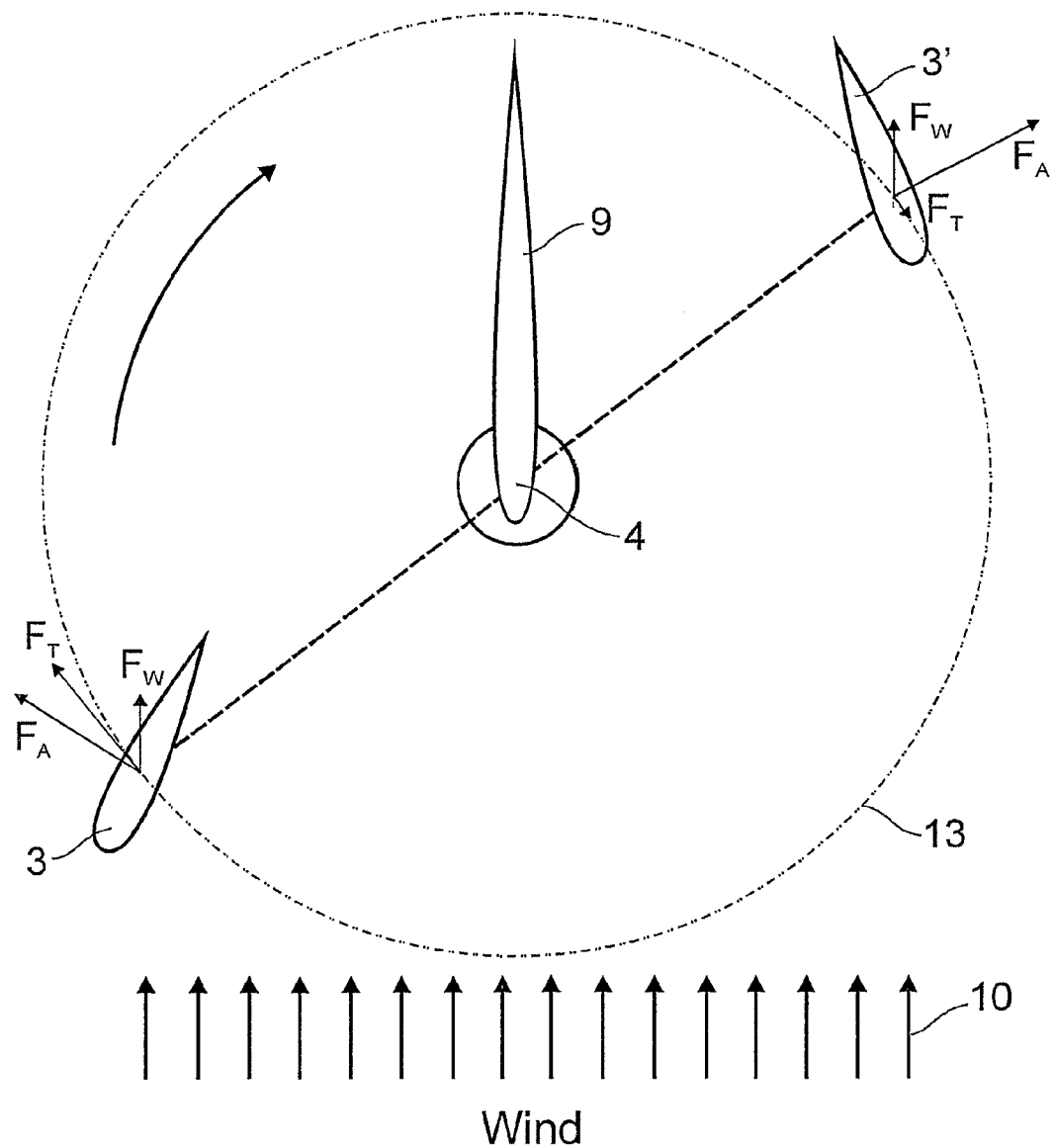
FIG. 3 is a top plan view illustrating the orientation of the blades depending on the angle of rotation in two selected positions.

FIG. 3 shows schematically the control of blades 3 dependent on their angle of rotation in two selected positions 3 and 3' of their trajectory 13 around the vertical axis of rotation 4. The work angles of the blade profiles 8 are different from one another and depend on each point of their trajectory 13, and can assume both negative and positive values with respect to the direction of the wind 10, which produces the wind force $F_w$, so that the propulsion $F_A$ at each rotation angle of the blade 3 fluctuates continually between negative and positive values, so that the resultant force $F_T$ always assumes the positive values in the direction of rotation.

LIST OF REFERENCE NUMBERS

1 Wind rotor
2 Tower
3 Rotor blade
4 Central vertical axis
5 Central main bearing
6 Horizontal crossbars
7 Blade bearing
8 Symmetric aerodynamic profile
9 Wind vane
10 Wind direction
11 Primary control mechanism
12 Secondary control mechanism
13 Circular trajectory of the blade
14 Groove pulley
15 Stepping engine

The invention claimed is:

1. A flow-controlled wind motor rotor comprising:
one or more blades, said blades rotating around a central vertical axis in a main bearing, said blades being parallel to the central vertical axis, said blades being connected via crossbars, said blades being disposed freely rotatably in bearings, said blades comprising a symmetrical aerodynamic profile over their entire cross-section, said blades being orientable to a direction of a wind, and said rotor comprising a wind vane to capture the direction of the wind, wherein
said rotor comprises a primary control mechanism, which is controlled by said wind vane and aligns said profiles of said blades along the wind direction at each point of their trajectory around the central vertical axis, said blades being disposed on said crossbars,
said rotor comprises a secondary control mechanism, which is subordinate to the primary control mechanism and aligns longitudinal axes of said profiles of said blades to the wind at each point of their trajectory around the central vertical axis so as to produce an optimum aerodynamic force depending on a rotation angle of the crossbars with respect to the wind vane and a rotation velocity of the crossbars, and
said primary control mechanism comprises a belt transmission with a common driving pulley and at least one V-belt drive, and the secondary control mechanism comprises at least one stepping engine with a worm gear.

2. The wind rotor of claim 1, wherein the control mechanisms are mechanically, electromechanically, hydraulically or pneumatically controlled.

3. The wind rotor of claim 2, wherein said wind vane is disposed concentrically and rotatably in the main bearing on the central vertical axis.

4. The wind rotor of claim 2, wherein the blades are positioned in the bearings on the crossbars with an upward and/or a downward bias.

5. The wind rotor of claim 1, wherein said wind vane is disposed concentrically and rotatably in the main bearing on the central vertical axis.

6. The wind rotor of claim 5, wherein the blades are positioned in the bearings on the crossbars with an upward and/or a downward bias.

7. The wind rotor of claim 1, wherein said blades are positioned in said bearings on said crossbars with an upward and/or a downward bias.

* * * * *